US008064904B2

(12) United States Patent
Jain et al.

(10) Patent No.: US 8,064,904 B2
(45) Date of Patent: Nov. 22, 2011

(54) INTERNETWORKING BETWEEN A FIRST NETWORK AND A SECOND NETWORK

(75) Inventors: Nikhil Jain, San Diego, CA (US); Andrew T. Hunter, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 484 days.

(21) Appl. No.: 10/804,265

(22) Filed: Mar. 18, 2004

(65) Prior Publication Data

US 2005/0010692 A1 Jan. 13, 2005

Related U.S. Application Data

(60) Provisional application No. 60/455,909, filed on Mar. 18, 2003.

(51) Int. Cl.
*H04W 4/00* (2009.01)

(52) U.S. Cl. .................. 455/432.1; 455/435.1

(58) Field of Classification Search .......... 455/410, 455/411, 432.1, 435.1, 466
See application file for complete search history.

(56) References Cited

U.S. PATENT DOCUMENTS

| | | | |
|---|---|---|---|
| 4,901,307 A | 2/1990 | Gilhousen et al. | |
| 5,675,629 A | 10/1997 | Raffel et al. | |
| 5,862,481 A * | 1/1999 | Kulkarni et al. | 455/432.2 |
| 5,878,036 A | 3/1999 | Spartz et al. | |
| 5,887,251 A | 3/1999 | Fehnel | |
| 6,144,653 A | 11/2000 | Persson et al. | |
| 6,195,338 B1 | 2/2001 | Decker | |
| 6,223,026 B1 | 4/2001 | Martschitsch | |
| 6,298,232 B1 * | 10/2001 | Marin et al. | 455/413 |
| 6,320,873 B1 | 11/2001 | Nevo et al. | |
| 6,408,173 B1 * | 6/2002 | Bertrand et al. | 455/406 |
| 6,564,055 B1 * | 5/2003 | Hronek | 455/433 |
| 6,584,310 B1 | 6/2003 | Berenzweig | |
| 6,681,111 B2 * | 1/2004 | Ahn et al. | 455/432.2 |
| 6,839,434 B1 | 1/2005 | Mizikovsky | |
| 6,853,729 B1 | 2/2005 | Mizikovsky | |
| 7,043,238 B2 | 5/2006 | Ahn et al. | |
| 7,110,747 B2 | 9/2006 | Jain et al. | |
| 7,155,526 B2 | 12/2006 | Chaudhary et al. | |

(Continued)

FOREIGN PATENT DOCUMENTS

AU  2003293525  7/2004

(Continued)

OTHER PUBLICATIONS

International Search Report—PCT/US04/008536—International Search Authority, US—Nov. 2, 2006.

(Continued)

*Primary Examiner* — Barry Taylor
(74) *Attorney, Agent, or Firm* — Sandip S. Minhas; Stanton Braden

(57) ABSTRACT

A general global gateway (GGG) internetworks between a first network and a second network so that a mobile station having a subscription in a first network can roam into a second network and be authenticated to use the second network. The GGG obtains authentication parameters from the mobile station and determines whether the authentication parameters satisfy GGG authentication criteria. If it does, then the GGG accesses the first network and stores authentication information from the first network for subsequent accesses to the first network by the mobile station.

22 Claims, 3 Drawing Sheets

U.S. PATENT DOCUMENTS

| | | |
|---|---|---|
| 7,343,490 B2 | 3/2008 | Le et al. |
| 7,471,622 B2 | 12/2008 | You et al. |
| 7,660,417 B2 | 2/2010 | Blom et al. |
| 7,733,901 B2 | 6/2010 | Salkini et al. |
| 2001/0044295 A1 | 11/2001 | Saito et al. |
| 2002/0094811 A1 | 7/2002 | Bright et al. |
| 2003/0101345 A1 | 5/2003 | Nyberg |
| 2003/0108007 A1 | 6/2003 | Holcman et al. |
| 2004/0003056 A1 | 1/2004 | Yamaguchi et al. |
| 2004/0116155 A1 | 6/2004 | Aisenberg |
| 2004/0133623 A1* | 7/2004 | Murtagh et al. ............ 709/200 |
| 2004/0137899 A1 | 7/2004 | Hartmaier |
| 2004/0224666 A1 | 11/2004 | Jain et al. |
| 2004/0224667 A1 | 11/2004 | Jain et al. |
| 2005/0011666 A1 | 1/2005 | Hughey et al. |
| 2005/0096014 A1 | 5/2005 | Jain et al. |
| 2005/0143396 A1 | 6/2005 | Parthasaradhi et al. |
| 2005/0215245 A1 | 9/2005 | Tian et al. |
| 2005/0238171 A1 | 10/2005 | Chen et al. |
| 2006/0050680 A1 | 3/2006 | Naim et al. |
| 2006/0246949 A1 | 11/2006 | Gupta et al. |
| 2007/0180242 A1 | 8/2007 | Nagaraj et al. |

FOREIGN PATENT DOCUMENTS

| | | |
|---|---|---|
| CN | 1259811 | 7/2000 |
| EP | 0955783 | 11/1999 |
| EP | 1001570 | 5/2000 |
| EP | 1124401 | 8/2001 |
| EP | 1257143 | 11/2002 |
| JP | 06-500900 | 1/1994 |
| JP | 0669882 | 3/1994 |
| JP | 11513853 | 11/1999 |
| JP | 2000-013873 | 1/2000 |
| JP | 2000269959 | 9/2000 |
| JP | 2001005782 | 1/2001 |
| JP | 2001-251292 | 9/2001 |
| JP | 2002-320255 | 10/2002 |
| JP | 2003078969 A | 3/2003 |
| KR | 19990088046 | 12/1999 |
| RU | 2172077 | 8/2000 |
| RU | 2160975 | 12/2000 |
| WO | 9202087 | 2/1992 |
| WO | 9715161 | 4/1997 |
| WO | 0013441 | 3/2000 |
| WO | 02062085 | 8/2000 |
| WO | 0154435 | 7/2001 |
| WO | 0241641 | 5/2002 |
| WO | WO 2004084424 | 9/2004 |

OTHER PUBLICATIONS

Written Opinion—PCT/US04/008536—International Search Authority, US—Nov. 2, 2006.

International Preliminary Report on Patentability—PCT/US04/008536—IPEA, US—May 3, 2007.

Supplementary European Search Report—EP04757656, Search Authority—The Hague—Aug. 17, 2009.

Chauhan, Cellular Subscriber Authentication IS-95. Oct. 10, 2001. http://www.geocities.com/rahulsedmapage/Documents/Authentication_slides.pdf.

Haverinen, et al., "Authentication and Key Generation for Mobile IP using GSM Authentication and Roaming" Communications, 2001. ICC 2001. IEEE International Conference on, vol. 8, Jun. 11-14, 2001, pp. 2453-2457.

Rose, "Authentication and Security in Mobile Phones" Aug. 1999, QUALCOMM Australia, pp. 1-6.

Translation of Office Action in Chinese application 200480015359.0 corresponding to U.S. Appl. No. 10/817,196, citing CN1259811 dated Apr. 18, 2011.

* cited by examiner

INTERNETWORKING BETWEEN A FIRST NETWORK AND A SECOND NETWORK

CROSS-REFERENCE TO RELATED APPLICATION

This application claims priority from U.S. Provisional Patent Application Ser. No. 60/455,909, filed Mar. 18, 2003.

REFERENCE TO CO-PENDING APPLICATIONS FOR PATENT

"Authenticating Between A CDMA Network And A GSM Network," having U.S. patent application Ser. No. 10/804, 301, and "Using Shared Secret (SSD) To Authenticate Between A CDMA Network And A GSM Network," having U.S. patent application Ser. No. 10/804,267, filed concurrently herewith and assigned to the assignee hereof, and which is expressly incorporated by reference herein.

FIELD OF THE INVENTION

The present invention relates generally to wireless communication systems, and more particularly to systems that permit internetworking between a first network and a second network.

BACKGROUND

Code division multiple access (CDMA) is a digital wireless technology that inherently has relatively greater bandwidth capacity, i.e., that inherently permits the servicing of more telephone calls per frequency band, than other wireless communication technologies. Moreover, the spread spectrum principles of CDMA inherently provide secure communications. U.S. Pat. No. 4,901,307, incorporated herein by reference, sets forth details of a CDMA system, which can be used to transmit both voice calls and non-voice computer data.

Despite the advantages of CDMA, other wireless systems exist that use other principles. For example, in much of the world GSM is used, which employs a version of time division multiple access.

Whether CDMA principles or other wireless principles are used, wireless communication systems can be thought of as having two main components, namely, the wireless radio access network (RAN) and the core infrastructure which communicates with the RAN and with external systems, such as the public switched telephone network (PSTN), the Internet (particularly although not exclusively for data calls), etc. The core infrastructures associated with the various wireless technologies can be very expensive, both in terms of hardware and in terms of developing communication protocols to support particularized, typically system-specific call switching, subscription and attendant authentication and call monitoring, and billing. Consequently, the communication protocols of one wireless system (in the case of GSM, GSM protocols, and in the case of CDMA such as cdma2000-1x, IS-41 protocols) may not be compatible with those of another system without expensively prohibitive alterations in the core infrastructure of one system or the other.

It would be desirable to internetwork between a CDMA network and a GSM network, thereby enabling the use of a CDMA-based RAN, with its attendant advantages, and enabling the use of a GSM-based core infrastructure, since GSM is extant in much of the world.

Thus, a dual-mode mobile station may be enabled to advantageously interface with a GSM core infrastructure when in, e.g., Europe, and to use a CDMA infrastructure when in, e.g., the United States.

SUMMARY OF THE INVENTION

In one aspect of the present invention, a general global gateway (GGG) is configured to support communication between a first network and a second network to enable a mobile station (MS) subscribed in the first network to communicate using the second network, comprising a database configured to store an identity of the mobile station and a logic unit configured to execute program logic to obtain authentication information from the first network based on the identity of the mobile station.

In another aspect of the present invention, a general global gateway (GGG) comprises is a means for storing an identity of the mobile station and means for executing program logic to obtain authentication information from the first network based on the identity of the mobile station.

In yet another aspect of the present invention, a method of wireless communications between a first network and a second network enabling a mobile station (MS) subscribed in the first network to communicate using the second network, comprises storing an identity of the mobile station, obtaining authentication information from the first network based on the identity of the mobile station, storing the authentication information from the first network in a general global gateway (GGG), and using the stored authentication information from the first network to authenticate the mobile station.

In a further aspect of the present invention, computer readable media embodying a program of instructions executable by a computer program to perform a method of wireless communications between a first network and a second network enabling a mobile station (MS) subscribed in the first network to communicate using the second network, the method comprises storing an identity of the mobile station, obtaining authentication information from the first network based on the identity of the mobile station, storing the authentication information from the first network in a general global gateway (GGG), and using the stored authentication information from the first network to authenticate the mobile station.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

Figure 1:
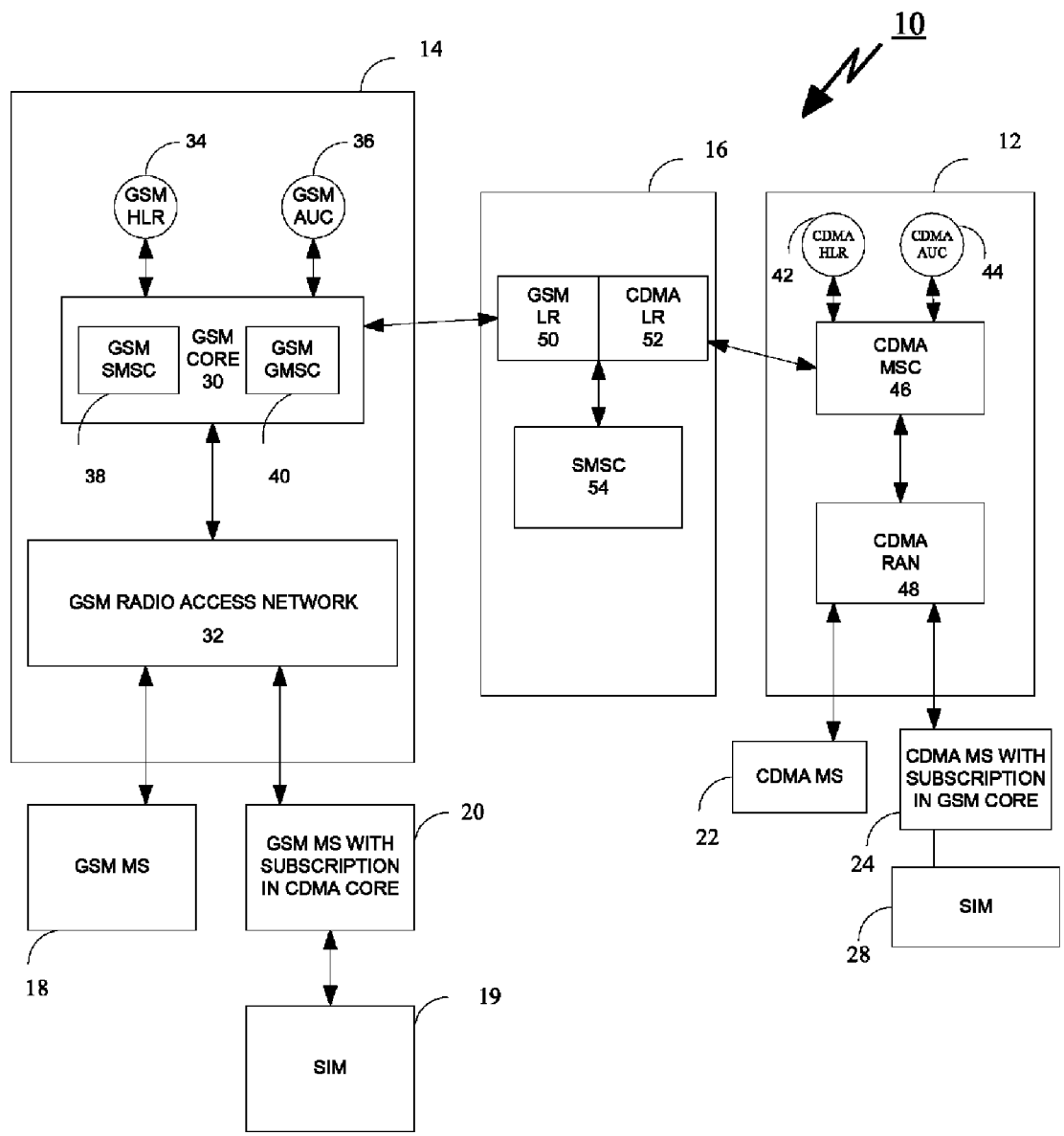
FIG. 1 shows a block diagram of a wireless communications system comprising a CDMA network, a GSM network, a General Global Gateway (GGG), and mobile stations.

The present invention relates generally to wireless communication systems, and more particularly to systems that permit internetworking between a first network and a second network. FIG. 1 shows a first network, a CDMA network 12, internetworking with a second network, a GSM network 14, in accordance with an embodiment.

FIG. 1 shows a block diagram of a wireless communications system 10 comprising a CDMA network 12, a GSM network 14, General Global Gateway (GGG) 16, and mobile stations 18, 20, 22, 24. GSM mobile station 20 includes a Subscriber Identity Module (SIM) 26. CDMA mobile station 24 includes SIM 28. SIMs 26, 28 are removable engaged with mobile stations 20, 24, respectively, in accordance with principles known in the art. In an embodiment involving a GSM network, the GGG is called a GSM Global Gateway.

The GGG 16 internetworks between the CDMA network 12 and the GSM network 14. The GGG includes a transceiver (not shown) that allows it to send and receive messages to and from the CDMA network 12 and the GSM network 14.

In an embodiment, the CDMA network is an ANSI-41 network. It would be apparent to those skilled in the art, the CDMA network 12 may be any variety of CDMA networks including, but not limited to cdma2000-1x and cdma2000-1xEV-DO.

It would also be apparent to those skilled in the art, the GSM network 14 may be any variety of GSM network or successor network including, but not limited to General Packet Radio Services (GPRS), Universal Mobile Telecommunication System (UMTS), and Wideband-CDMA (W-CDMA).

It would further be apparent to those skilled in the art that the networks 12, 14 are not limited to GSM and CDMA. For example, the networks 12, 14 could be 802.11, WiMax, or Internet Protocol (IP) networks. The CDMA network 12 and GSM network 14 are specified in FIG. 1 for illustration purposes. In an embodiment, if one of the two networks 12, 14 is a GSM network, the GGG could be considered an acronym for GSM Global Gateway.

The GSM network 14 comprises a GSM Core 30 and a GSM Radio Access Network 32. The GSM Core 30 comprises a GSM Home Location Register (GSM HLR) 34, a GSM Authentication Center (GSM AuC) 36, a GSM Short Message Center (GSM SMSC) 38 and a GSM Gateway Mobile Switching Center (GSM GMSC) 40. The CDMA network 12 comprises a a CDMA Home Location Register (CDMA HLR) 42, a CDMA Authentication Center (CDMA AuC) 44, CDMA MSC 46 and associated CDMA Radio Access Network (CDMA RAN) 48.

With respect to a GSM mobile station with a subscription in a CDMA Core 20, the GGG 16 functions as a Visitor Location Register (VLR) 50 to the GSM network 14. With respect to a CDMA mobile station 24 with a subscription in a GSM Core 30, the GGG 16 functions as a Visitor Location Register (Visitor LR) 52 to the CDMA network 12.

Mobile stations 18, 20, 22, 24 do not need to have a subscription in both core infrastructures 12, 14 and may have a subscription in only one of the core infrastructures 12, 14.

With respect to both the GSM mobile station with a subscription in a CDMA Core 20 and a CDMA mobile station with a subscription in a GSM Core 24, the GGG 16 functions as a Short Message Service Center (SMSC) 54. It would be apparent to those skilled in the art that the GGG 16 can include or communicate with the SMSC 54.

In an embodiment, the GGG 16 includes a service center that sends and receives IP messages. It would be apparent to those skilled in the art that the GGG 16 may include any service center known in the art to send and receive messages in the protocol of the service center. In an embodiment, message may be sent and received by the GGG 16, wherein the messages deliver services that are provided by the first network that may not be provided by the second network.

Mobile stations 18, 20 support a GSM signaling protocol, a GSM Authentication procedure, and a GSM Short Message Service. Likewise, mobile stations 22, 24 support a CDMA signaling protocol, a CDMA Authentication procedure, and a CDMA Short Message Service.

During registration of a CDMA mobile station with a subscription in the GSM core 24, the GGG acts as an Authentication Controller in a CDMA network, but authenticates the mobile station 24 using the GSM authentication mechanism. Likewise, during registration of a GSM mobile station with a subscription in the CDMA core 20, the GGG acts as an Authentication Controller in a GSM network, but authenticates the mobile station 20 using the CDMA authentication mechanism.

The GGG 16 acts as a message center via Short Message Service Center 54. In a CDMA network, SMS messages are routed to and from the mobile station 24 using a GSM SMS mechanism. Likewise, in a GSM network, SMS messages are routed to and from the mobile station 20 using a CDMA SMS mechanism.

The GGG 16 receives a location message from a mobile station 20, 24. The GGG uses an identifier in the location message to obtain authentication information to know which HLR/AuC it needs to interrogate.

An incoming call to a registered GSM subscriber 24 arrives at GSM gateway MSC (GSM GMSC) 40 in the subscriber's home GSM network 14. The GMSC 40 interrogates the GSM LR 50 to determine the location of the subscriber 24, which is in the CDMA network 12. The location of the GSM subscriber 24 from the perspective of the GSM LR 50 is in the GGG 16, which appears as a GSM VLR. When the GSM LR 50 requests routing information from the GGG 16, the GGG 16 requests routing information from the serving CDMA LR 52 and thus the call is routed to the CDMA MSC 46.

Likewise, an incoming call to a registered CDMA subscriber 20 arrives at CDMA MSC 46 in the subscriber's home CDMA network 12. The CDMA MSC 46 interrogates the CDMA LR 52 to determine the location of the subscriber 20, which is in the GSM network 14. The location of the CDMA subscriber 20 from the perspective of the CDMA LR 52 is in the GGG 16, which appears as a CDMA VLR. When the CDMA LR 52 requests routing information from the GGG 16, the GGG 16 requests routing information from the serving GSM LR 50 and thus the call is routed to the GSM GMSC 40.

The CDMA-based mobiles stations 22, 24 communicate with a CDMA mobile switching center (MSC) 46 using a CDMA radio access network (RAN) 48 in accordance with CDMA principles known in the art. In an embodiment, the CDMA MSC 46 is an IS-41 MSC.

Likewise, the GSM-based mobiles stations 18, 20 communicate with a GSM mobile switching center (GSM GMSC) 40 using a GSM RAN 32 in accordance with GSM principles known in the art.

In accordance with CDMA principles known in the art, the CDMA RAN 48 includes base stations and base station controllers. In an embodiment, CDMA RAN 24 shown in FIG. 1 uses cdma2000, and specifically uses either cdma2000 1x, cdma2000 3x, or cdma2000 high data rate (HDR) principles.

In accordance with GSM principles known in the art, the GSM RAN 32 includes base stations and base station controllers. In an embodiment, GSM RAN 32 uses either GSM, GPRS, EDGE, UMTS, or W-CDMA principles.

The CDMA core infrastructure comprising the CDMA MSC 46 and CDMA RAN 48 can include or can access a CDMA authentication center (CDMA AUC) 44 and a CDMA home location register (CDMA HLR) 42 in accordance with CDMA principles known in the art to authenticate subscriber mobile station 22, and to collect accounting and billing information as required by the particular CDMA core infrastructure.

Likewise, the GSM core 30 can include or can access a GSM authentication center (GSM AUC) 36 and a GSM home location register (GSM HLR) 34 in accordance with GSM principles known in the art to authenticate subscriber mobile station 18, and to collect accounting and billing information as required by the particular GSM core infrastructure.

The CDMA MSC 46 uses the GGG 16 to communicate with the GSM network 14. The GSM network 14 can include or can access a GSM authentication center 36 and a GSM home location register (HLR) 34 in accordance with GSM principles known in the art to authenticate subscriber mobile station 24 and to collect accounting and billing information as required by the particular GSM core 30.

Likewise, GSM GMSC 40 uses the GGG 16 to communicate with the CDMA network 12. The CDMA network 12 can include or can access a CDMA authentication center 44 and a CDMA home location register (HLR) 42 in accordance with CDMA principles known in the art to authenticate subscriber mobile station 20 and to collect accounting and billing information as required by the particular CDMA network 12.

Both the GSM core 30 and the CDMA core infrastructure can communicate with a network such as a public switched telephone network (PSTN) and/or an Internet Protocol (IP) network.

With respect to a CDMA mobile station 24 with a subscription in a GSM Core 30, the GGG 16 functions as a VLR 50 to the GSM network 14. The GGG meets GSM protocol requirements for a VLR 50. The GGG interacts with GSM core network elements such as GSM HLR 34 and GSM SMSC 38 according to GSM specifications, except that the GGG 16 routes incoming calls to the CDMA network 12. The GSM LR 50 also performs a location update with the GSM network 14 when the mobile station registers in the CDMA network 12. In this sense, the GGG acts as a VLR to the whole CDMA network 12.

With respect to a GSM mobile station 20 with a subscription in a CDMA network 12, the GGG 16 functions as a VLR 52 to the CDMA network 14. The GGG meets CDMA protocol requirements for a VLR 52. The GGG interacts with CDMA core network elements such as CDMA HLR 42 and CDMA MSC 46 according to CDMA specifications, except that the GGG 16 routes incoming calls to the CDMA network 12. The CDMA LR 52 also performs a location update with the CDMA network 12 when the mobile station registers in the GSM network 14. In this sense, the GGG acts as a VLR to the whole GSM network 14.

When a mobile station that is in the CDMA network 12 is called from the GSM network 14, the call is routed to the CDMA LR 52 in the GGG 16 per standard specifications. The GGG 16 routes the call to the CDMA network 12. The CDMA network 12 eventually routes the call to the CDMA MSC 46 serving the mobile station. Similarly, if an SMS is routed to the CDMA network 12 from the GSM network 14, the GGG 16 routes the message to a message center (not shown) within the CDMA network 12.

When a mobile station that is in the GSM network 14 is called from the CDMA network 12, the call is routed to the GSM LR 50 in the GGG 16 per standard specifications. The GGG 16 routes the call to the GSM network 14. The GSM network 14 eventually routes the call to the GSM GMSC 40 serving the mobile station. Similarly, if an SMS is routed to the GSM network 10 from the CDMA network 12, the GGG 16 routes the message to a GSM SMSC 38 within the GSM network 14.

When a mobile station registers with the CDMA network 12, the CDMA network 12 sends a location update indication to the GSM network 14. The GSM LR 50 then performs a location update as per standard specifications with the GSM core network 14.

When a mobile station registers with the GSM network 14, the GSM network 14 sends a location update indication to the CDMA network 12. The CDMA LR 52 then performs a location update as per standard specifications with the CDMA network 12.

With respect to a CDMA mobile station 24 with a subscription in a GSM Core 30, the GGG 16 acts as an HLR 52 in the CDMA network 12. The CDMA LR 52 shall meet HLR protocol requirements for GSM to CDMA roaming. An important piece of information that the HLR maintains is the address of the CDMA MSC 46 serving the mobile station 24. When the GSM LR 50 in the GGG 16 routes a call to the CDMA side 12, the CDMA LR 52 will further route it to the serving MSC 46.

With respect to a GSM mobile station 20 with a subscription in a CDMA network 12, the GGG 16 acts as an HLR 50 in the GSM network 14. The GSM LR 50 shall meet HLR protocol requirements for CDMA to GSM roaming. An important piece of information that the HLR maintains is the address of the GSM GMSC 40 serving the mobile station 20. When the CDMA LR 52 in the GGG 16 routes a call to the GSM side 14, the GSM LR 50 will further route it to the serving MSC 40.

The GGG acts as an Authentication Controller (AUC) in the CDMA network for GSM subscribers 24. The AUC 44 in a CDMA network 12 is responsible for authenticating a mobile station and permitting/denying access to network resources. The AUC function in the GGG does not call for A-key provisioning at the GGG or the MS. Instead the GGG uses the GSM authentication credentials and the GSM authentication method via GSM signaling to authenticate the mobile station 24. The GGG responds to valid messages that can be received by a CDMA AUC 44.

The GGG acts as an Authentication Controller (AUC) in the GSM network for CDMA subscribers 20. The AUC 36 in a CDMA network 14 is responsible for authenticating a mobile station and permitting/denying access to network resources. The AUC function in the GGG does not call for A-key provisioning at the GGG or the MS. Instead the GGG uses the CDMA authentication credentials and the CDMA authentication method via CDMA signaling to authenticate the mobile station 20. The GGG responds to valid messages that can be received by a GSM AUC 36.

The GGG 16 acts as a Message Center (MC) in the CDMA network 12 and routes SMS messages between the CDMA mobile station 24 and GSM GMSC 40 using a GSM SMS mechanism.

Likewise, the GGG 16 acts as a Message Center (MC) in the GSM network 14 and routes SMS messages between the GSM mobile station 20 and CDMA MSC 46 using a CDMA SMS mechanism.

The CDMA MS 24 is required to have a valid identity in the CDMA network. If this identity is different from the GSM International Mobile Subscriber Identity (IMSI) (i.e., if the CDMA network does not use true IMSI), then the GGG provides a mapping between the CDMA identity and the GSM IMSI. It would be apparent to those skilled in the art that any technique/method known in the art to uniquely identify the mobile station 24 may be used.

The GSM MS 20 is required to have a valid identity in the GSM network. In an embodiment, this identity is a GSM IMSI (i.e., if the CDMA network does not use true IMSI). If the identity in the GSM network is different from the identity in a CDMA network, then the GGG provides a mapping between the GSM identity and the CDMA identity. It would be apparent to those skilled in the art that any technique/method known in the art to uniquely identify the mobile station 20 may be used.

In a non-limiting embodiment, mobile stations 18, 20, are mobile telephones made by Kyocera, Samsung, or other manufacturer that use GSM principles and GSM over-the-air (OTA) communication air interfaces. In a non-limiting embodiment, mobile stations 22, 24, are mobile telephones made by Kyocera, Samsung, or other manufacturer that use CDMA principles and CDMA over-the-air (OTA) communication air interfaces. The present invention, however, applies to other mobile stations such as laptop computers, wireless handsets or telephones, data transceivers, or paging and position determination receivers. The mobile stations can be hand-held or portable as in vehicle-mounted (including cars, trucks, boats, planes, trains), as desired. However, while wireless communication devices are generally viewed as being mobile, it is to be understood that the present invention can be applied to "fixed" units in some implementations. Also, the present invention applies to data modules or modems used to transfer voice and/or data information including digitized video information, and may communicate with other devices using wired or wireless links. Further, commands might be used to cause modems or modules to work in a predetermined coordinated or associated manner to transfer information over multiple communication channels. Wireless communication devices are also sometimes referred to as user terminals, mobile stations, mobile units, subscriber units, mobile radios or radiotelephones, wireless units, or simply as "users" and "mobiles" in some communication systems.

Figure 2A:
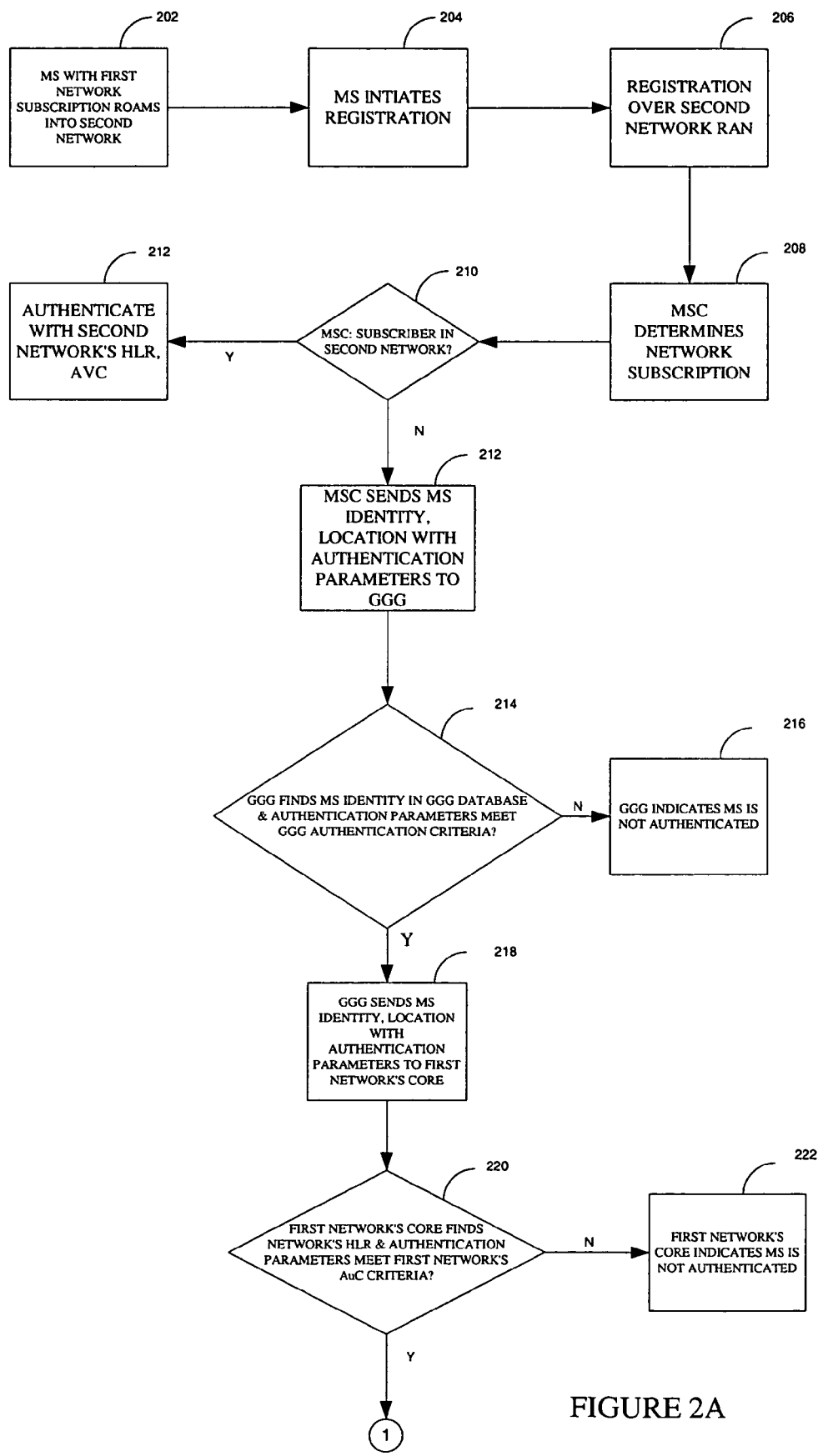
FIGS. 2a and 2b shows a flowchart for authenticating and accessing a first network when roaming in a second network in accordance with an embodiment.
Figure 2B:
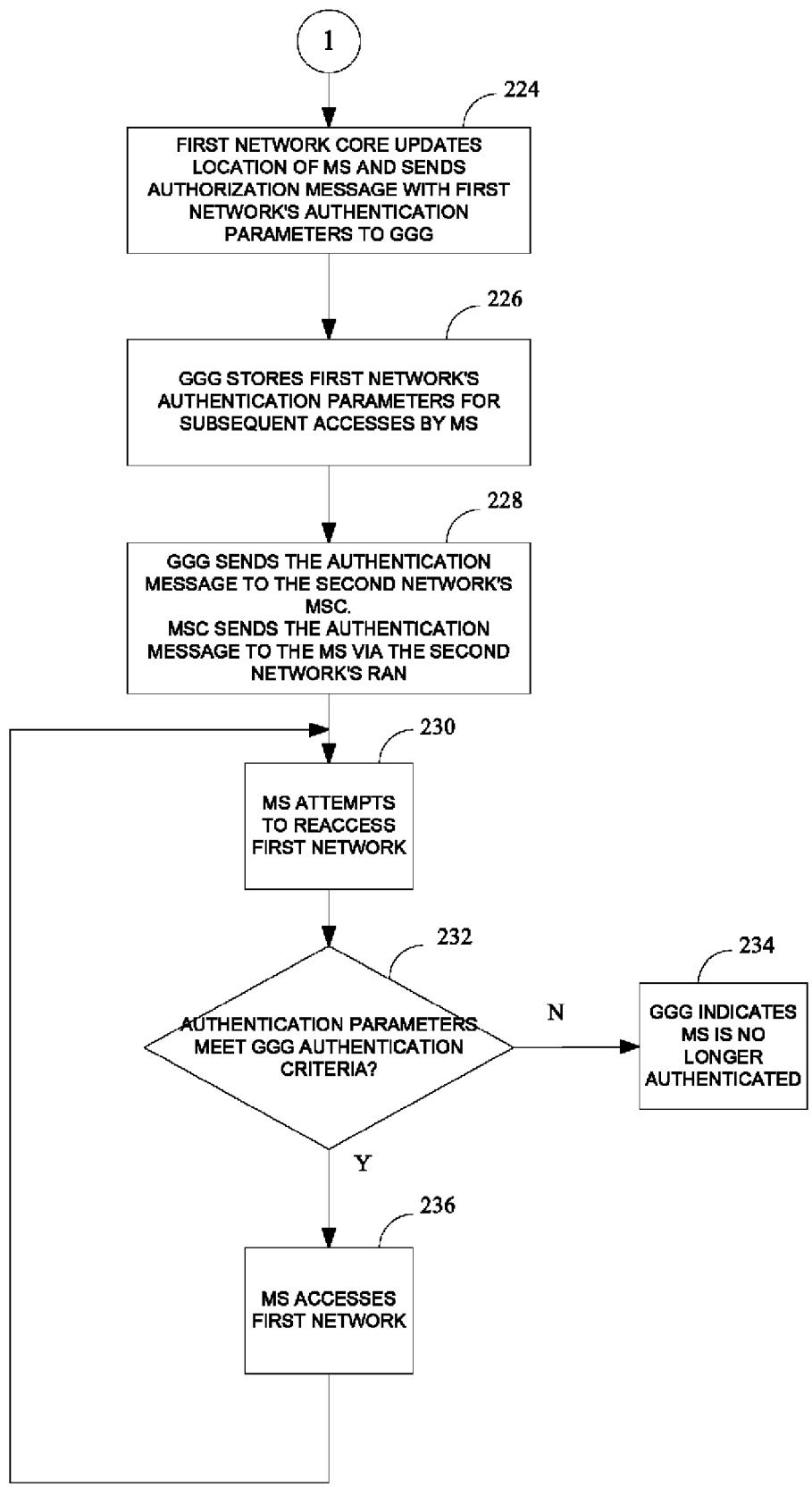

FIGS. 2a and 2b shows a flowchart for authenticating and accessing a first network when roaming in a second network in accordance with an embodiment. In step 202, mobile station 24 (MS) roams into a second network's area and the flow of control proceeds to step 204. In step 204, the mobile station initiates a registration system access and the flow of control proceeds to step 206. In step 206, the mobile station sends a registration message to a second network's MSC 46 via a second network's RAN 48 and the flow of control proceeds to step 208.

The registration system access is a message to the MSC 46 via the RAN 48, the message including an identity of the mobile station. In an embodiment, the identity of the mobile station may be provided by the SIM 28. In an embodiment, the identity of the mobile station 24 is an IMSI. In an embodiment, the identity of the mobile station is a Mobile Identification Number (MIN).

In step 208, the MSC 46 determines, based on the mobile station identity, the network subscription, i.e. whether the mobile station is a subscriber of the second network or the first network. In an embodiment, wherein the identity of the mobile station is an IMSI, the MSC 46 can make this determination because the IMSI contains, among other information, a code representing the country and network in which the mobile station has a subscription. The flow of control proceeds to step 210.

In step 210, the second network's MSC 46 determines the subscription of the mobile station from the mobile station identity. In step 210, the second network's MSC 46 checks whether the mobile station 24 is a subscriber of the second network. If the mobile station 24 is a subscriber of the second network, then the mobile station 22 is authenticated using principles of the second network's core infrastructure, using the second network's HLR 42 and AuC 44 in step 212. If the mobile station 24 is a subscriber of the first network 14, then the second network's MSC 46 sends the mobile station identity and location with authentication parameters to the GGG in step 212. The flow of control proceeds to step 214.

In step 214, a check is made to determine whether the GGG 16 finds the mobile station identity in a GGG database (not shown) and the authentication parameters satisfy GGG authentication criteria. If not, then in step 216, the GGG 16 sends a message to the mobile station via the second network's MSC 46 and RAN 48 indicating the mobile station is not authenticated. If the result of the check is true, then in step 218, the GGG 16 sends the mobile station identity and location with authentication parameters to the first network's core and the flow of control proceeds to step 220.

The GGG includes a logic unit (not shown) to execute program logic. It would be apparent to those skilled in the art that the logic unit may include a general purpose processor, a special-purpose processor, and/or firmware.

In step 220, a check is made to determine whether the first network's core finds the mobile station identity in the first network's HLR and that the authentication parameters meet the first network's authentication criteria. If not, then in step 222, the first network's core indicates sends a message to the mobile station via the second network's MSC 46 and RAN 48 indicating the mobile station is not authenticated. If the result of the check is true, then in step 224, the first network's core updates the location of the mobile station and sends an authentication message with the first network's authentication parameters to the GGG 16 and the flow of control proceeds to step 226.

In step 226, the GGG 16 stores the first network's authentication parameters for subsequent accesses by the mobile station. Thus, the entire authentication procedure may not need execution on a subsequent access, which means the first network's core may not need accessing. The flow of control proceeds to step 228.

In step 228, the GGG 16 sends the authentication message to the second network's MSC 46 and the MSC 46 sends the authentication message to the mobile station via the second network's RAN 48. The flow of control proceeds to step 230.

After a period of time, in step 230, the mobile station re-accesses the first network and the flow of control proceeds to step 232.

In step 232, a check is made to determine whether the authentication parameters continue to meet GGG authentication criteria. If not, then in step 234, the GGG 16 sends a message to the mobile station via the second network's MSC 46 and RAN 48. If the result of the check is true, then in step 236, the mobile station accesses the first network. The flow of control proceeds to step 230 for the next time the mobile station accesses the first network.

Method steps can be interchanged without departing from the scope of the invention.

Once authenticated, the mobile station 24 can communicate directly with the first network 14 via an IP network, for example. It would be apparent to those skilled in the art that when the mobile station is not authenticated, the mobile station may retry authentication depending the application.

While the particular INTERNETWORKING BETWEEN A CDMA NETWORK AND A GSM NETWORK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

Method steps can be interchanged without departing from the scope of the invention.

The invention claimed is:

1. A general global gateway (GGG), between a first network and a second network, configured to support communication between the first network and the second network to enable a mobile station (MS) subscribed in the first network to communicate using the second network, comprising:
    a database configured to store an identity of the mobile station; and
    a logic unit configured to execute program logic to
        obtain authentication information from the first network based on the identity of the mobile station,
        store the authentication information for the first network so that subsequent accesses of the other networks by the mobile station can be authenticated by the GGG without contacting the first network, and
        determine whether authentication parameters from the mobile station satisfy GGG authentication criteria, and
    wherein the GGG appears as a visitor location register to both the first and second networks.

2. The GGG of claim 1, further comprising
    a location register configured to store a location of the mobile station to enable a call incoming to the mobile station from the first network to route the incoming call to the mobile station through the GGG.

3. The GGG of claim 2, further comprising
    a second location register configured to store a location of the mobile station to enable a call outgoing from the mobile station to the first network to route the outgoing call from the mobile station through the GGG.

4. The GGG of claim 1, further comprising
    a service center configured to send and receive messages to and from the second network according to a message format of the service center.

5. The GGG of claim 4, wherein the service center is configured to send and receive Internet Protocol (IP) messages to and from the second network.

6. The GGG of claim 4, wherein the service center is a short message service center (SMSC) configured to send and receive messages to and from the second network.

7. The GGG of claim 6, wherein the SMSC is configured to send and receive SMS messages to validate a subscription in a network.

8. The GGG of claim 4, wherein the messages deliver services that are provided by the first network that may not be provided by the second network.

9. The GGG of claim 1, wherein the logic unit is further configured to execute program logic to
    obtain authentication information from the second network based on the identity of a second mobile station subscribed with the second network but seeking to communicate using the first network; and
    store the authentication information for the second network so that subsequent accesses of other networks by the second mobile station can be authenticated by the GGG without contacting the second network.

10. A general global gateway (GGG), between a first network and a second network, configured to support communication between the first network and the second network to enable a mobile station (MS) subscribed in the first network to communicate using the second network, comprising:
    means for storing an identity of the mobile station; and
    means for obtaining authentication information from the first network based on the identity of the mobile station,
    means for storing the authentication information for the first network so that subsequent accesses of other networks by the mobile station can be authenticated by the GGG without contacting the first network, and
    means for determining whether authentication parameters from the mobile station satisfy GGG authentication criteria, and
    wherein the GGG appears as a visitor location register to both the first and second networks.

11. The GGG of claim 10, further comprising means for storing a location of the mobile station to enable a call incoming to the mobile station from the first network to route the incoming call to the mobile station through the GGG.

12. The GGG of claim 11, further comprising means for storing a location of the mobile station to enable a call outgoing from the mobile station to the first network to route the outgoing call from the mobile station through the GGG.

13. The GGG of claim 10, further comprising:
    means for obtaining authentication information from the second network based on the identity of a second mobile station subscribed with the second network but seeking to communicate using the first network; and
    means for storing the authentication information for the second network so that subsequent accesses of other networks by the second mobile station can be authenticated by the GGG without contacting the second network.

14. A method of wireless communications between a first network and a second network enabling a mobile station (MS) subscribed in the first network to communicate using the second network, comprising:
    storing an identity of the mobile station;
    obtaining authentication information from the first network based on the identity of the mobile station;
    storing the authentication information from the first network in a general global gateway (GGG), between a first network and a second network, so that subsequent accesses of other networks by the mobile station can be authenticated by the GGG without contacting the first network, wherein the GGG appears as a visitor location register to both the first and second networks;
    using the authentication information from the first network stored at the GGG to authenticate the mobile station; and determining whether authentication parameters from the mobile station satisfy GGG authentication criteria.

15. The method of claim 14, further comprising storing a location of the mobile station to enable a call incoming to the mobile station from the first network to route the incoming call to the mobile station through the GGG.

16. The method of claim 15, further comprising storing a location of the mobile station to enable a call outgoing from the mobile station to the first network to route the outgoing call from the mobile station through the GGG.

17. The method of claim 14, further comprising communicating directly from the mobile station to the first network after the mobile station has been authenticated in the first network.

18. The method of claim 14, further comprising:
obtaining authentication information from the second network based on the identity of a second mobile station subscribed with the second network but seeking to communicate using the first network; and
storing the authentication information for the second network so that subsequent accesses of other networks by the second mobile station can be authenticated by the GGG without contacting the second network.

19. Computer readable media embodying a program of instructions executable by a computer program to perform a method of wireless communications between a first network and a second network enabling a mobile station subscribed in the first network to communicate using the second network, the method comprising:
storing an identity of the mobile station;
obtaining authentication information from the first network based on the identity of the mobile station;
storing the authentication information for the first network in a general global gateway (GGG), between the first network and the second network, so that subsequent accesses of other networks by the mobile station can be authenticated by the GGG without contacting the first network;
using the stored authentication information from the first network to authenticate the mobile station; and
determining whether authentication parameters from the mobile station satisfy GGG authentication criteria.

20. The computer readable media of claim 19, the method further comprising:
obtaining authentication information from the second network based on the identity of a second mobile station subscribed with the second network but seeking to communicate using the first network; and
storing the authentication information for the second network so that subsequent accesses of other networks by the second mobile station can be authenticated by the GGG without contacting the second network.

21. A processor comprising:
a processing circuit configured to
store an identity of the mobile station;
obtain authentication information from the first network based on the identity of the mobile station;
store the authentication information for the first network in a general global gateway (GGG), between a first network and a second network, so that subsequent accesses of other networks by the mobile station can be authenticated by the GGG without contacting the first network;
use the stored authentication information from the first network to authenticate the mobile station; and
determine whether authentication parameters from the mobile station satisfy GGG authentication criteria; and
wherein the GGG appears as a visitor location register to both the first and second networks.

22. The processor of claim 21, wherein the processing circuit is further configured to:
obtain authentication information from the second network based on the identity of a second mobile station subscribed with the second network but seeking to communicate using the first network; and
store the authentication information for the second network so that subsequent accesses of other networks by the second mobile station can be authenticated by the GGG without contacting the second network.

* * * * *